US009002600B2

(12) United States Patent
Gibson et al.

(10) Patent No.: US 9,002,600 B2
(45) Date of Patent: *Apr. 7, 2015

(54) METHODS AND SYSTEMS FOR ENGINE SHUT-DOWN CONTROL

(75) Inventors: Alex O'Connor Gibson, Ann Arbor, MI (US); Peter John Grutter, Plymouth, MI (US); Roger Lyle Huffmaster, Canton, MI (US); Felix Nedorezov, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 937 days.

This patent is subject to a terminal disclaimer.

(21) Appl. No.: 12/348,196

(22) Filed: Jan. 2, 2009

(65) Prior Publication Data

US 2010/0174459 A1   Jul. 8, 2010

(51) Int. Cl.
| | | |
|---|---|---|
| *G06F 7/00* | (2006.01) | |
| *F02N 11/08* | (2006.01) | |
| *F02M 3/00* | (2006.01) | |
| *B60W 10/06* | (2006.01) | |
| *B60W 10/115* | (2012.01) | |
| *B60W 30/18* | (2012.01) | |
| *F16H 61/14* | (2006.01) | |

(52) U.S. Cl.
CPC ............ *B60W 10/06* (2013.01); *B60W 10/115* (2013.01); *B60W 30/18054* (2013.01); *B60W 2510/0676* (2013.01); *B60W 2510/244* (2013.01); *B60W 2540/12* (2013.01); *F16H 61/14* (2013.01)

(58) Field of Classification Search
USPC ........... 701/51, 53–55, 67, 68, 70, 82–87, 90, 701/95; 477/38, 107, 111, 174, 180, 181; 123/179.4, 339.1
See application file for complete search history.

(56) References Cited

U.S. PATENT DOCUMENTS

| | | | | |
|---|---|---|---|---|
| 5,679,099 | A * | 10/1997 | Kato et al. ..................... | 477/176 |
| 6,023,648 | A * | 2/2000 | Murasugi et al. ............... | 701/68 |
| 6,054,844 | A * | 4/2000 | Frank ................. | 322/16 |
| 6,258,008 | B1 * | 7/2001 | Tabata et al. .................. | 477/107 |
| 6,309,324 | B1 * | 10/2001 | Sawa et al. .................... | 477/125 |
| 6,463,375 | B2 | 10/2002 | Matsubara et al. | |
| 6,655,485 | B1 * | 12/2003 | Ito et al. ....................... | 180/65.6 |
| 6,730,000 | B1 * | 5/2004 | Leising et al. ................ | 477/110 |
| 6,754,579 | B2 | 6/2004 | Kamiya et al. | |
| 7,130,731 | B2 * | 10/2006 | Itoh et al. ........................ | 701/54 |
| 7,370,715 | B2 * | 5/2008 | Colvin et al. ............... | 180/65.28 |
| 7,449,793 | B2 * | 11/2008 | Cho et al. ...................... | 290/1 A |
| 7,524,266 | B2 * | 4/2009 | Nobumoto et al. ........... | 477/110 |
| 7,610,143 | B1 * | 10/2009 | Boesch ......................... | 701/112 |

(Continued)

FOREIGN PATENT DOCUMENTS

EP    0990793    9/1999

*Primary Examiner* — James Trammell
*Assistant Examiner* — Majdi Alsomiri
(74) *Attorney, Agent, or Firm* — Julia Voutyras; Alleman Hall McCoy Russell & Tuttle LLP

(57) ABSTRACT

An example method of operation comprises, selectively shutting down engine operation responsive to operating conditions and without receiving an engine shutdown request from the operator, maintaining the automatic transmission in gear during the shutdown, and during an engine restart from the shutdown condition, and with the transmission in gear, transmitting reduced torque to the transmission. For example, slippage of a forward clutch of the transmission may be used to enable the transmission to remain in gear, yet reduce torque transmitted to the vehicle wheels.

14 Claims, 4 Drawing Sheets

(56) References Cited

U.S. PATENT DOCUMENTS

| | | | |
|---|---|---|---|
| 2002/0179047 A1* | 12/2002 | Hoang et al. | 123/350 |
| 2003/0171868 A1* | 9/2003 | Morishita et al. | 701/54 |
| 2004/0043859 A1* | 3/2004 | Yurgil et al. | 475/318 |
| 2004/0127326 A1* | 7/2004 | Tajima et al. | 477/3 |
| 2005/0080523 A1* | 4/2005 | Bennett et al. | 701/22 |
| 2006/0111823 A1* | 5/2006 | Tamai | 701/38 |
| 2006/0137920 A1* | 6/2006 | Aoki et al. | 180/65.2 |
| 2006/0184304 A1* | 8/2006 | Katou et al. | 701/54 |
| 2007/0078040 A1 | 4/2007 | Nobumoto et al. | |
| 2007/0114082 A1 | 5/2007 | Nozaki et al. | |
| 2008/0029331 A1* | 2/2008 | Schiele | 180/338 |
| 2008/0275625 A1* | 11/2008 | Snyder | 701/104 |

\* cited by examiner

METHODS AND SYSTEMS FOR ENGINE SHUT-DOWN CONTROL

FIELD

The present application relates to methods and systems for controlling an engine restart.

BACKGROUND AND SUMMARY

Vehicles have been developed to perform an idle-stop when idle-stop conditions are met and then automatically restart the engine when restart conditions are met. Such idle-stop systems enable fuel savings, reduction in exhaust emissions, reduction in noise, and the like.

Many factors may contribute to the engine automatically restarting without receiving any input from the operator. As one example, the engine may be automatically restarted when a vehicle battery state of charge (SOC) falls below a predetermined threshold, such as 30% SOC. In such a situation, the engine may be restarted, even though the brake pedal is engaged by the operator, for a sufficient amount of time to allow the battery parameter to be returned to the desired level (for example, to at least 30% SOC). Following a resetting of the parameter, the engine may return to the shutdown state.

However, the inventors have recognized several potential issues with such a method. As one example, during subsequent restarts, if the transmission remains coupled to the wheels, the operator may feel an uncomfortable feeling during engine restarts not initiated by an operator's launch request. However, if the transmission were decoupled from the wheels during a shutdown and no torque was provided to the wheels during subsequent restarts, when an operator subsequently requests a vehicle launch, a desirable fast launch may not be achievable.

Thus in one example, some of the above issues may be addressed by a method of controlling a powertrain of a vehicle, the powertrain including an engine and an automatic transmission, the powertrain coupled to driving wheels of the vehicle, and the vehicle operated by an operator. The method may comprise, selectively shutting down engine operation responsive to operating conditions and without receiving an engine shutdown request from the operator, and maintaining the automatic transmission in gear during the shutdown. The method may further comprise, during an engine restart from the shutdown condition, and with the transmission in gear, transmitting reduced torque to the transmission.

In one example, the operating conditions may include a high battery state of charge, or no request for cabin cooling. As such, during such operating conditions, and when no request for an engine shutdown is made by the operator, a first automatic engine shutdown may be performed. In another example, operator requested engine shutdown conditions may include an ignition key-off condition or an actuated engine shut-down button. As such, during such operator requested conditions, a second alternative engine shutdown may be performed. During either engine shutdown, the transmission may be kept in gear. Furthermore, during a subsequent engine restart from shutdown conditions, the transmission may be kept in gear so that a reduced torque may be transmitted to the automatic transmission. In one example, the reduced torque may be provided by actuating the transmission to internally lock the transmission and block transfer of input torque to the wheels. In another example, the decreased torque may be provided by increasing slippage of a forward clutch of the transmission. In still another example, a combination of transmission actuation and slippage increase may be employed, a relative amount of transmission actuation to slippage increase determined at least by engine operating conditions.

In another embodiment, the method comprises, selectively shutting down engine operation responsive to operating conditions and without receiving an engine shutdown request from the operator. The method further comprises, during a first engine restart from the shutdown condition, and with the transmission in gear, transmitting decreased torque through the transmission to launch the vehicle; and during a second engine restart from the shutdown condition, and with the transmission in gear, transmitting increased torque through the transmission.

In one example, a first or automatic restart (or non-launch based restart) may be performed responsive to restart conditions and without a launch request from the operator. Herein, a decreased torque may be transmitted through the transmission by increasing clutch slippage of a forward clutch of the transmission, by actuating the transmission to thereby internally lock the transmission and block transfer of input torque to the wheels, or a combination thereof. In another example, a second or launch-based restart may be performed responsive to restart conditions and with a launch request from the operator. Herein, an increased torque may be transmitted through the transmission by engaging a forward clutch of the transmission, reducing slippage of the forward clutch, engaging a torque converter lock-up clutch, reducing slippage of the torque converter lock-up clutch, or any combination thereof.

In this way, by maintaining the transmission in gear during the shutdown, as also during a subsequent engine restart, a fast vehicle launch may be provided when a restart is requested by the operator. By reducing the torque transmitted during an automatic engine restart, the drive-feel effect of the restart may be reduced. In this way, issues related to both launch-based restarts and automatic (or non-launch based) restarts may be addressed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
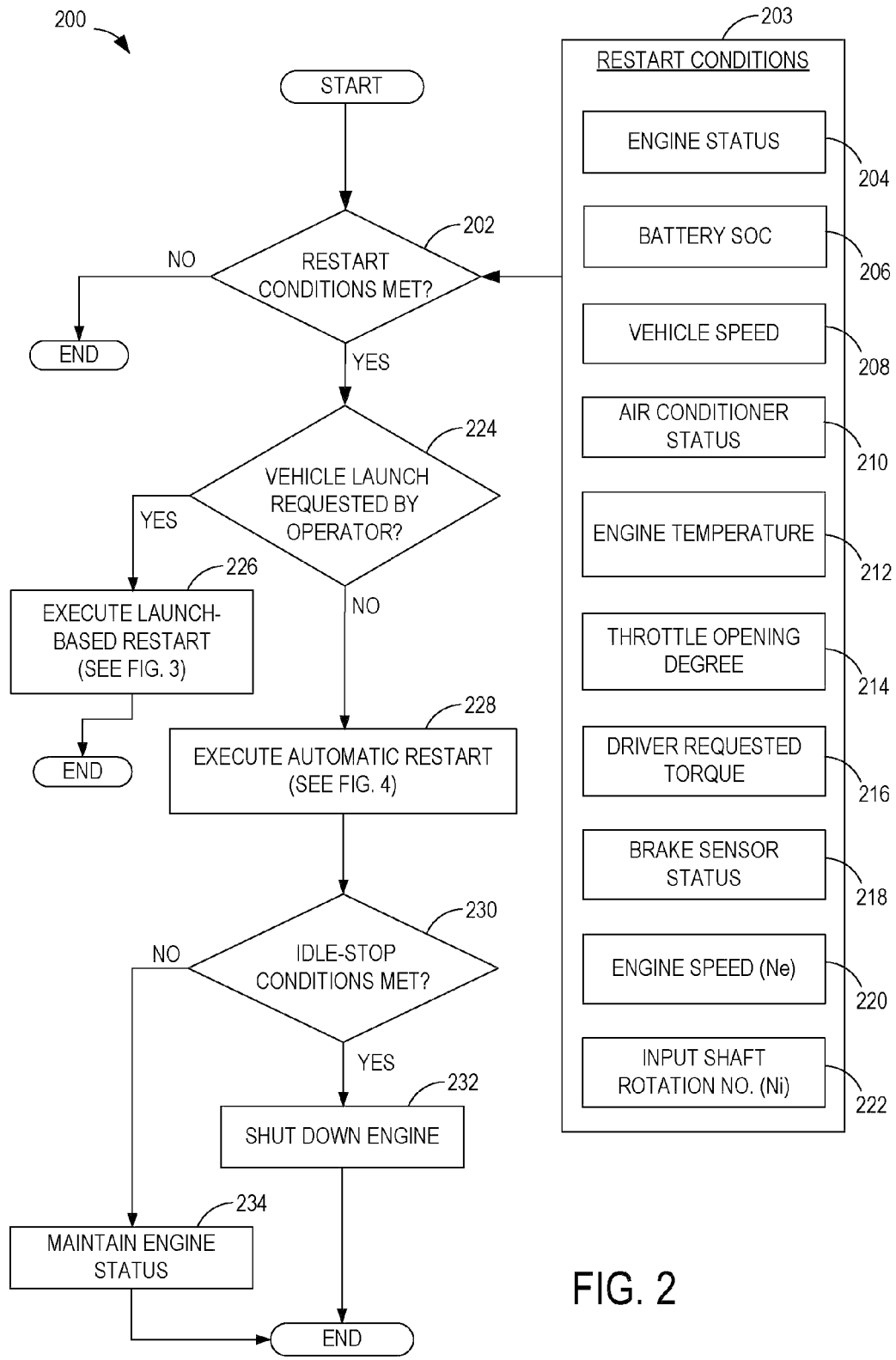
FIG. 2 shows a high level flow chart for executing a restart operation.
Figure 3:
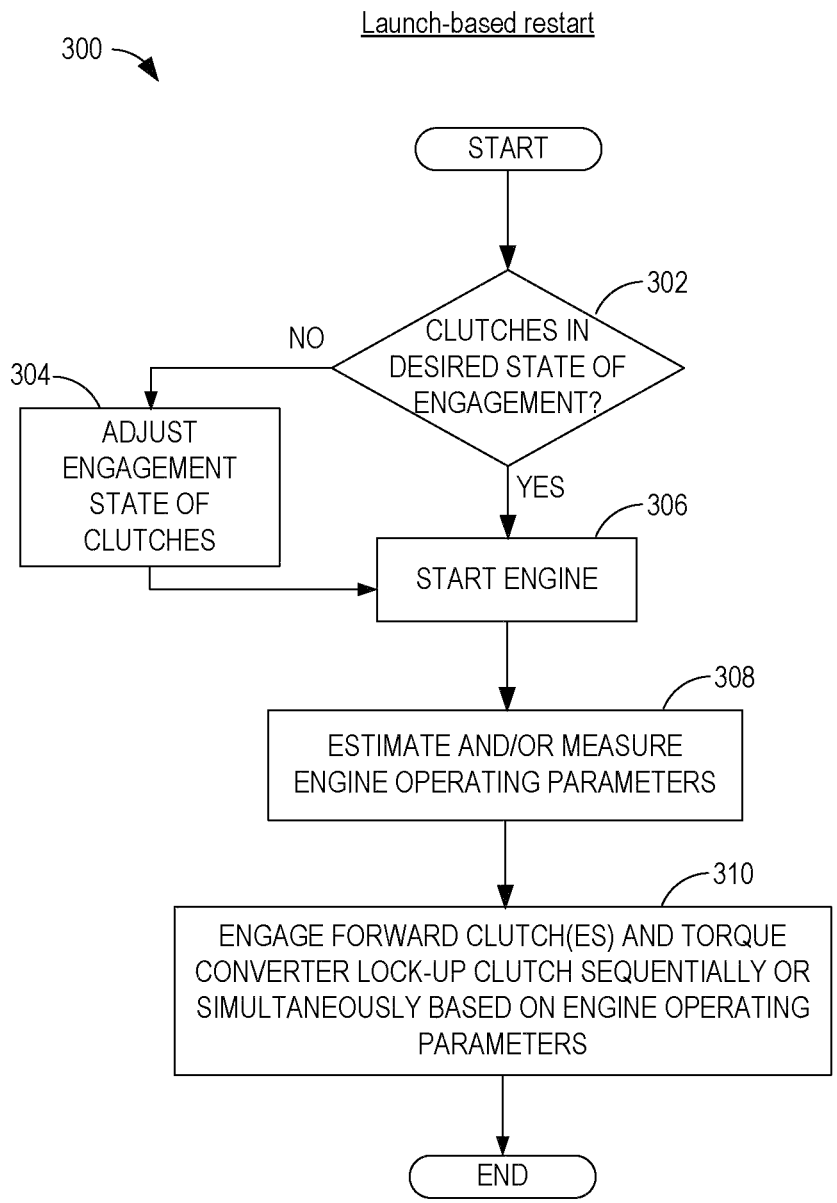
FIG. 3 shows a high level flow chart for executing a launch based restart operation.
Figure 4:
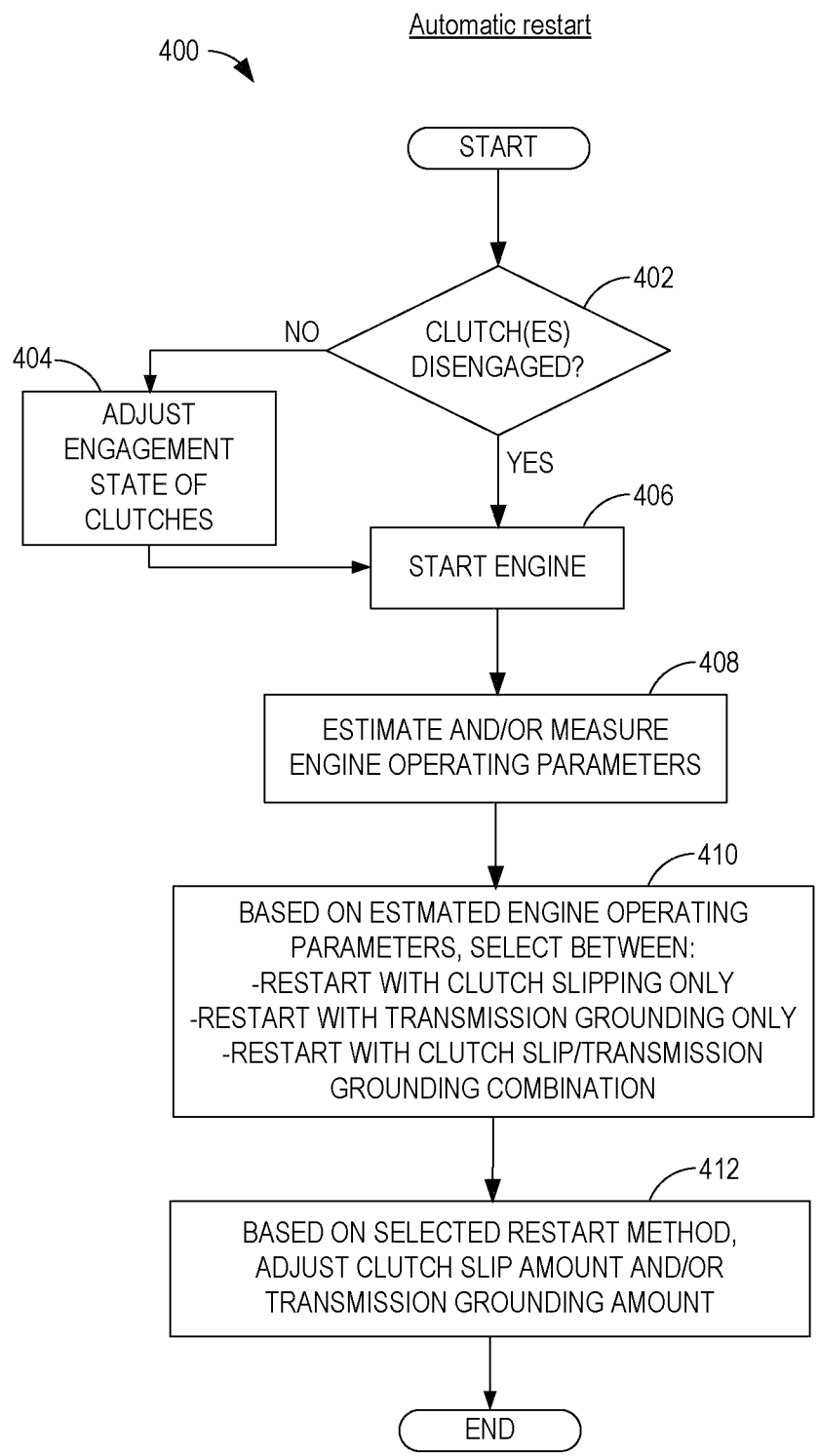
FIG. 4 shows a high level flow chart for executing an automatic (or non-launch based) restart operation.

The following description relates to systems and methods for adjusting transmission torque output when restart conditions are met, based on whether an operator has requested a vehicle launch. As shown in FIGS. 2-4, an engine control system may be configured to select between an automatic (or non-launch based) restart operation and a launch based restart operation based on the fulfillment of restart criteria and the status of a vehicle brake pedal. During the automatic restart operation (FIG. 4), the engine control system may select between a clutch slipping method, a transmission grounding method, or an adjusted combination of the two methods, based on a variety of engine operating parameters, to thereby provide reduced or decreased torque to the wheels, while the brake is applied. In contrast, during the launch based restart operation (FIG. 3), the engine control system may adjust an engagement of transmission clutches or reduce slippage of the clutches to thereby transmit an increased torque through the transmission to the wheels to thereby enable a vehicle launch. By enabling reduced or substantially no transmission output to be selectively maintained during an engine automatic restart, the drive feel during such an engine restart may be improved. Further, by maintaining the transmission in gear during the restart, it may be possible to provide a rapid launch of the vehicle as soon as an operator requests a vehicle launch. In this way, issues related to automatic restarts and launch based restarts may be addressed.

Figure 1:
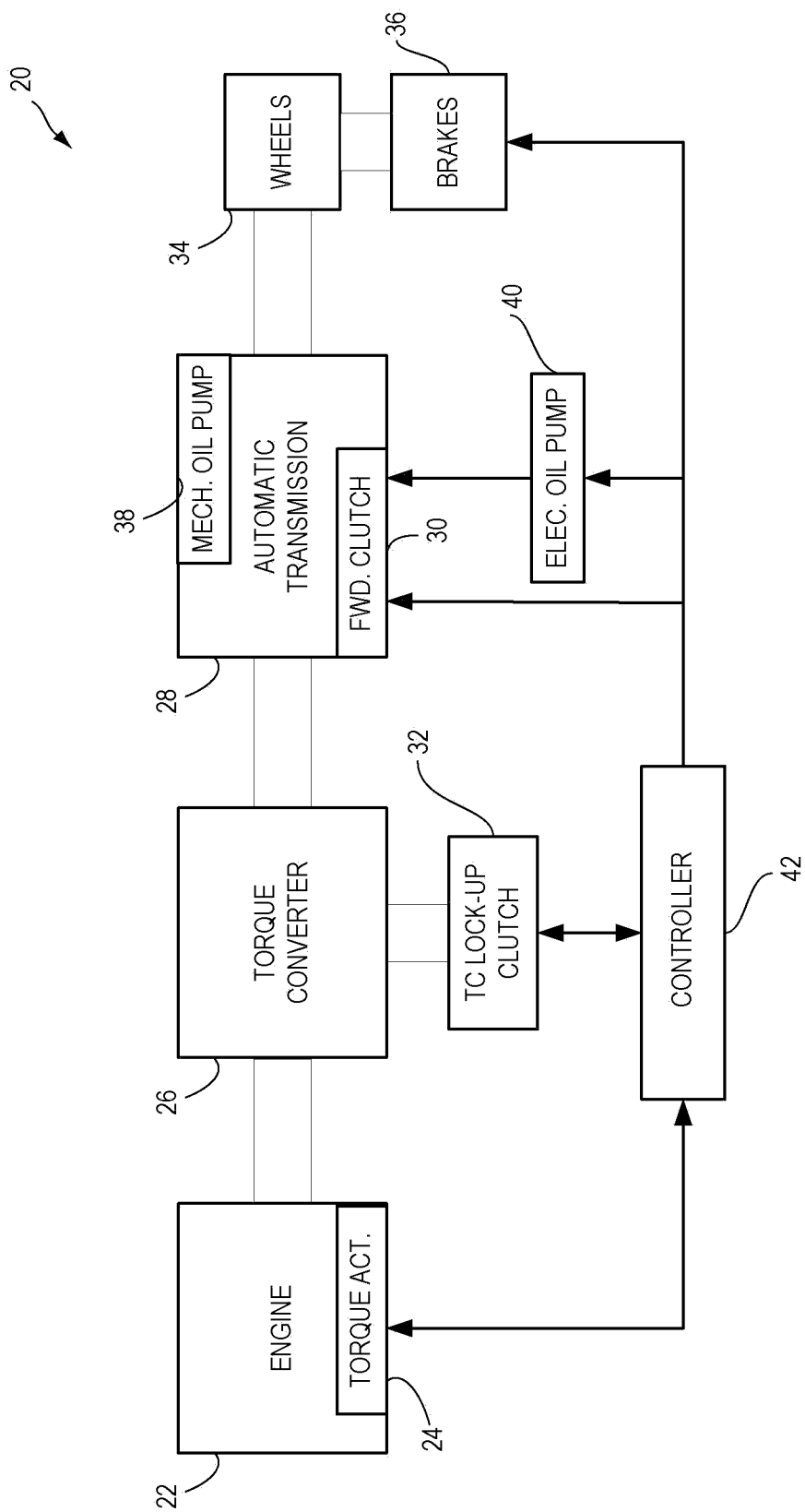
FIG. 1 shows an example vehicle system layout, including details of a vehicle drive-train.

FIG. 1 is a block diagram of a vehicle drive-train 20. Drive-train 20 may be powered by engine 22. In one example, engine 22 may be a gasoline engine. In alternate embodiments, other engine configurations may be employed, for example a diesel engine. Engine 22 may be started with an engine starting system (not shown). Further, engine 22 may generate torque via torque actuator 24, such as a fuel injector, throttle, etc. Engine 22 may further include an auxiliary starter system (not shown) to support engine restart at near zero engine speed, for example at 50 RPM.

An engine output torque may be transmitted to torque converter 26 to drive an automatic transmission 28 by engaging one or more clutches, including one or more forward clutch(es) 30. As such, a plurality of such clutches may be engaged, as needed. The output of the torque converter may in turn be controlled by torque converter lock-up clutch 32. As such, when torque converter lock-up clutch 32 is fully disengaged, no torque may be transmitted from torque converter 26 to automatic transmission 28. In contrast, when torque converter lock-up clutch 32 is fully engaged, the entire engine output torque may be relayed to an input shaft (not shown) of transmission 28. Alternatively, the torque converter lock-up clutch 32 may be partially engaged, thereby enabling the amount of torque relayed to the transmission to be adjusted. A controller may be configured to adjust the amount of torque transmitted by slipping one or more of the clutches 30 and 32. The rate of slippage may be adjusted responsive to various engine operating conditions, or for example, based on a desired response time to an operator-based vehicle launch request. Alternatively, the controller may be configured to use the engaged clutches to ground the transmission output shaft to the transmission case. Further still, the controller may be configured to use a combination of clutch slipping and transmission grounding to achieve a desirable balance between reduced transmission output and the ability to re-launch the vehicle rapidly in response to an operator launch request.

Torque output from the automatic transmission 28 may in turn be relayed to wheels 34 to propel the vehicle. Specifically, automatic transmission 28 may adjust an input driving force along the input shaft (not shown) responsive to a vehicle traveling condition before transmitting an output driving force to the wheels. As such, wheels 34 may be locked by engaging wheel brakes 36. In one example, wheel brakes 36 may be engaged in response to the operator pressing his foot on a brake pedal (not shown). In the same way, wheels 34 may be unlocked by disengaging wheel brakes 36 in response to the operator releasing his foot from the brake pedal.

A mechanical oil pump 38 may be connected to the automatic transmission to provide hydraulic pressure to engage forward clutch 30. Mechanical oil pump 38 may be operated in accordance with torque converter 26, and may be driven by engine 22. An electric oil pump 40, independent from the driving force of the engine 22, may be provided to supplement the hydraulic pressure of the mechanical oil pump. Electric oil pump 40 may be driven by a motor (not shown) to which an electric power may be supplied, for example by a battery (not shown).

A controller 42 may be configured to receive inputs from engine 22 and accordingly control a torque output of the engine. As one example, a torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 42 may control the engine torque output by controlling a combination of fuel pulse width, fuel pulse timing, and air charge. In all cases, engine control may be performed on a cylinder-by-cylinder basis to control the engine torque output.

As such, prior to a restart operation, the vehicle engine may be in a shutdown state. A vehicle control system may be configured to selectively shutdown engine operation responsive to operating conditions and without receiving an engine shutdown request from the operator. The controller may further maintain the transmission in gear during the shutdown, and then during the subsequent restart from shutdown condition, may maintain the transmission in gear, and may transmit increased or decreased torque to the transmission, based on whether a vehicle launch is requested or not.

When restart conditions are satisfied, for example when a restart is requested due to a battery state of charge (SOC) falling below a predetermined threshold, and further if a vehicle launch is requested, for example as indicated by an operator releasing his foot off the brake pedal, controller 42 may perform a restart with increased torque transmission from the automatic transmission to the wheels, to thereby launch the vehicle. Upon starting the engine, the increased torque transmission may be provided by one or more of engaging a forward clutch, reducing slippage of the forward clutch, engaging a torque converter lock-up clutch and reducing slippage of the torque converter lock-up clutch. As the engine is started and brake is released, and further as the transmission output is transferred to the wheels to launch the vehicle, the engine output may be used to recharge the battery.

In contrast, when restart conditions are satisfied but a vehicle launch is not (as yet) requested, controller 42 may start the engine but provide reduced or decreased torque transmission from the automatic transmission to the wheels. In one example, transmitting reduced torque to the transmission includes transmitting substantially no torque through the transmission. The decreased transmission output may be provided by slipping one or more of the clutches and/or by using the transmission clutches to ground the transmission output shaft to the transmission case. In this way, substantially no torque may be output from the transmission, however, upon a sudden operator request for vehicle launch (for example if the operator suddenly removes his foot off the brake pedal), clutch slippage and/or transmission grounding can be rapidly reversed and the vehicle may be launched. The controller may choose a relative amount of slippage and/or transmission grounding based on a large variety of parameters such as a desired response time to the operator request for vehicle launch, a predetermined maximum slippage limit, a condition of the clutches, etc. The clutches may be maintained in their slipped status until a launch request is made by the operator, or until the restart parameter has been satisfied (that is, if the restart was started due to a battery SOC falling below a threshold, clutch slippage may be maintained until the battery SOC has been restored to or above the threshold). Once the restart parameter has been satisfied, if no vehicle launch has been requested, the controller 42 may proceed to confirm whether idle-stop conditions have been met. If so, an engine shut down may proceed to enable fuel savings, reduction in exhaust emissions, reduction in noise, and the like.

FIGS. 2-4 further elaborate the automatic and operator-requested restart operations that may be performed by the engine controller through the use of example routines.

Now turning to FIG. 2, a routine 200 is described for performing a restart operation in the vehicle system of FIG. 1. At 202, it is confirmed whether restart conditions 203 have been met. Any or all of the restart conditions 203, as further described herein, may be met for a restart condition to be confirmed. For example, at 204, the engine status may be determined. Herein it may be verified that the engine is currently in idle-stop status (e.g., not carrying out combustion). At 206, the battery state of charge (SOC) may be determined. In one example, if the battery SOC is less than 30%, it may be determined that an engine restart may be required. At 208, it may be verified that the desired vehicle running speed is above a threshold. In one example, the desired speed may be at least 30 mph. At 210, an air-conditioner status may be assessed and it may be verified whether the air conditioner has issued a request for restarting the engine, as may be requested if air conditioning or cabin cooling is desired. At 212, the engine temperature may be estimated and/or measured to determine if it is within a selected temperature range. In one example, the engine temperature may be inferred from an engine coolant temperature and an engine restart condition may be selected when the engine coolant temperature is below a predetermined threshold. At 214, a throttle opening degree may be determined using a throttle opening degree sensor. In one example, the sensor reading may be used to detect whether a start has been requested by the vehicle operator. At 216, the operator requested torque may be estimated to indicate that it is more than a predetermined threshold value. At 218, a brake sensor status may be read. At 220, the engine speed may be determined. At 222, the input shaft rotation number (Ni) may be determined. Other restart criteria may include an air conditioner compressor status, brake pressure, oil pressure, and battery temperature.

If restart conditions are not met at 202, the routine may end. However, if any or all of the restart conditions are met, then at 224, it is determined whether a vehicle launch has been requested by the operator. In one example, the brake pedal status may be assessed to determine if the operator has requested a vehicle launch. If the operator has requested a vehicle launch (for example, the brake pedal is released), then at 226, an launch based restart operation, as further elaborated in FIG. 3, may be executed to launch the vehicle, following which the routine may end. However, if no launch is requested by the operator (for example, the brake pedal is applied), then at 228, an automatic restart operation, as further elaborated in FIG. 4, may be executed without vehicle launch. In one example, an automatic restart may be initiated due to a battery SOC falling below a predetermined threshold. Herein, due to the automatic restart operation, the battery SOC may be restored to a value at or above the predetermined threshold, following which the automatic restart may end.

Following completion of the automatic restart, at 230, it may be determined whether idle-stop conditions have been met. As such, the engine control system may be configured to shut down engine operation responsive to operating conditions (or idle-stop conditions) and without receiving an engine shutdown request from the operator. These conditions may include information pertaining to a battery state of charge, cabin cooling, air conditioner compressor status, brake pressure, oil pressure, engine temperature, battery temperature, engine coolant temperature, brake sensor status, vehicle speed, engine speed, input shaft rotation number, and throttle opening degree. In contrast, an engine shutdown request from the operator may include, for example, a key-off condition or an actuation of an engine shutdown button.

If idle-stop conditions are met at 230, then at 232, the engine may be shut down in an effort to provide fuel savings and emission benefits. If idle-stop conditions are not met at 230, then at 234, the engine status may be maintained until either idle-stop conditions are met or until the operator requests a vehicle launch.

FIG. 3 describes a routine 300 for performing a launch based restart operation, as may be requested when restart conditions are satisfied and a vehicle launch is requested by the operator. At 302, it may be verified whether the clutches are in a desired state of engagement. As one example, it may be verified whether forward clutch 30 is engaged (with or without controlled slippage) and whether torque converter lock-up clutch 32 is disengaged. As such, following a previous idle-stop operation and before monitoring of restart conditions, the forward clutch may have been engaged and the torque converter lock-up clutch 32 may have been disengaged. In an alternate example, it may be verified whether the torque converter lock-up clutch 32 is engaged and whether the forward clutch is engaged with controlled slippage. However, in the latter example, an auxiliary pump may be required with sufficient flow capacity to pressurize both the torque converter lock-up clutch and the forward clutch. Herein, it may be desirable to use a lower flow requiring position-lock torque converter lock-up clutch with a closed center design in lieu of an open center torque converter lock-up clutch.

If the clutches are not in the desired state of engagement, then at 304, the engagement state of the clutches may be adjusted to the desired configuration. Once the clutch configurations have been adjusted (or if they already were so at 302), then at 306, the engine may be started.

Next, at 308, the engine operating parameters may be estimated and/or measured. These may include estimating a clutch temperature, clutch conditions (for example, their degree of wear and tear), engine temperature, fuel levels, etc. Based on the engine operating parameters estimated at 308, at 310, the forward clutch (or clutches) and the torque converter lock-up clutch may be engaged either sequentially or simultaneously. In one example, when the vehicle is parked on level ground (not a hill) during the engine restart, the controller may first engage the transmission forward clutch followed by the torque converter lock-up clutch to better enable a smoother acceleration. In this way, an engine restart may be performed and the vehicle may be launched in a coordinated manner.

Now turning to FIG. 4, a routine 400 is described for performing an automatic restart operation, as may be requested when restart conditions are satisfied and when a vehicle launch is not (as yet) requested by the operator. Herein, an engine controller may be configured to adjust an engine operation to allow restart parameters to be returned to their desired values, while maintaining the transmission in a status wherein reduced to substantially no transmission output is provided. The reduced transmission output may be adjusted such that substantial transmission output may be rapidly provided if a sudden launch request is received.

At 402, it is verified whether the clutches have been disengaged following a previous idle-stop operation. If not, the clutches are brought to a disengaged state at 404 before starting the engine at 406. Alternatively, it may be verified whether at least one clutch is in a disengaged state. For example, it may be verified whether the torque converter lock-up clutch has been disengaged and the forward clutch has been engaged following a previous idle-stop operation. If not, the engagement state of the clutches may be adjusted at 404 before the engine is started at 406. At 408, as in 308, engine operating parameters are estimated and/or measured, including clutch temperature, clutch conditions, engine temperature, fuel levels, etc. Additional engine operating parameters whose details may be desired for proceeding with routine 400 may include determination of a desired response time in the event of a sudden operator launch request and determination of whether the vehicle is on an incline and further the degree of incline. Based on the engine operating parameters estimated at 408, at 410, the engine controller may select between a restart with clutch slipping only, restart with transmission grounding only, or a combination of the two. If clutch slipping is selected, a degree of clutch slippage may also be determined, including for example, which clutches are to be slipped and by what amount. Similarly, when restarting with transmission grounding, the degree of grounding may also be determined. Further still, when selecting a combination method, a balanced level between the maximum slip and the maximum grounding may have to be selected. Based on the selection and estimations made at 410, at 412, the appropriate clutches may be slipped and/or grounded by the appropriate amount.

In one example, when the level of fuel in the tank is low, and fuel economy is desired, the engine controller may preferably select a clutch slipping based restart. Similar, for an easier initial restart, a clutch slipping based restart may be preferred. In another example, if a very rapid response time is desired, a combination method may be preferred. In yet another example, if the temperature of the forward clutch is higher than, or close to, a predetermined upper threshold, the controller may prefer to restart using the transmission grounding approach.

In this way, an engine restart may be performed when restart conditions are satisfied and additionally the engine may be maintained in a status such that no torque is provided to the wheels while the engine is being restarted, but allowing torque to be transmitted rapidly and efficiently when an operator requests vehicle launch.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a vehicle powertrain, comprising:
   shutting down an engine responsive to operating conditions and without receiving a shutdown request from an operator, the shutdown including engine idle-stop;
   maintaining an automatic transmission in gear during the shutdown; and
   during an engine restart from the shutdown, and with the transmission in gear and grounded, transmitting reduced torque to the transmission by increasing slippage of a transmission clutch to adjust a degree of grounding, wherein transmitting reduced torque to the transmission further includes actuating the transmission to internally lock the transmission and block transfer of input torque to vehicle wheels.

2. The method of claim 1 wherein the shutdown request from the operator includes one or more of a key-off condition, and actuation of an engine shutdown button by the operator.

3. The method of claim 2 wherein shutting down an engine responsive to operating conditions and without receiving a shutdown request from the operator includes shutting down the engine responsive to one or more of a battery state of charge, cabin cooling, air conditioner compressor status, brake pressure, oil pressure, engine temperature, battery temperature, engine coolant temperature, brake sensor status, vehicle speed, engine speed, input shaft rotation number, and throttle opening degree.

4. The method of claim 3 further comprising, during an engine restart responsive to an operator launch request, providing increased torque transmission from the transmission to vehicle wheels to thereby launch the vehicle powertrain.

5. The method of claim 4 wherein the engine restart responsive to the operator launch request includes an engine restart responsive to one or more of engagement of throttle, release of brake pedal, and release of brakes.

6. The method of claim 5 wherein the engine restart includes crank and run-up of the engine.

7. The method of claim 1 wherein actuating the transmission to internally lock the transmission and block transfer of input torque to the wheels includes applying a clutch of the transmission to internally lock gears of the transmission to a casing of the transmission.

8. A method of controlling a powertrain of a vehicle, the powertrain including an engine and an automatic transmission, the powertrain coupled to driving wheels of the vehicle, the vehicle operated by an operator, the method comprising:
   selectively shutting down engine operation responsive to operating conditions and without receiving an engine shutdown request from the operator and maintaining the transmission in gear during the shutdown, the shutdown including engine idle-stop;

during a first non-launch engine restart from the shutdown condition, and with the transmission still in gear and grounded, transmitting decreased torque through the transmission by internally locking and blocking transfer of input torque to the wheels; and during a second launch engine restart from the shutdown condition, and with the transmission still in gear, transmitting increased torque through the transmission to launch the vehicle.

9. The method of claim 8 wherein transmitting increased torque through the transmission includes one or more of engaging a forward clutch of the transmission, reducing slippage of the forward clutch, engaging a torque converter lock-up clutch and reducing slippage of the torque converter lock-up clutch.

10. The method of claim 9 wherein transmitting increased torque through the transmission includes selecting a balanced level of a clutch slippage and a degree of transmission grounding, wherein the grounding includes grounding a transmission output shaft to a transmission case.

11. The method of claim 8 wherein the second launch engine restart is performed in response to a release of brakes by the operator.

12. The method of claim 8 wherein the first non-launch engine restart is performed in response to one or more of a battery state of charge, cabin cooling, air conditioner compressor status, brake pressure, oil pressure, engine temperature, battery temperature, engine coolant temperature, brake sensor status, vehicle speed, engine speed, input shaft rotation number, and throttle opening degree.

13. A vehicle powertrain control method, comprising:
shutting down an engine responsive to operating conditions and without receiving a shutdown request from an operator, the shutdown including engine idle-stop;
maintaining an automatic transmission in gear during the shutdown; and
during an engine restart from the shutdown with a clutch temperature above a threshold, and with the transmission in the maintained gear and grounded, adjusting transmitting transmission torque by adjusting a degree of transmission grounding, wherein the grounding includes grounding a transmission output shaft to a transmission case.

14. A method of controlling a vehicle powertrain, comprising:
shutting down an engine responsive to operating conditions and without receiving a shutdown request from an operator, the shutdown including engine idle-stop;
maintaining an automatic transmission in gear during the shutdown; and
during an engine restart from the shutdown, and with the transmission in gear and grounded, transmitting reduced torque to the transmission by increasing slippage of a transmission clutch to adjust a degree of grounding, wherein the grounding includes grounding a transmission output shaft to a transmission case.

* * * * *